United States Patent [19]

Jabami et al.

[11] Patent Number: 4,622,827

[45] Date of Patent: Nov. 18, 1986

[54] CONTROL APPARATUS FOR AN AIR CONDITIONER

[75] Inventors: Ryozo Jabami, Kusatsu; Akira Hamaguchi, Kouka; Shigeru Matsuda; Yasuyuki Ejima, both of Kusatsu, all of Japan

[73] Assignee: Matsushita Electric Industrial Co., Ltd., Kadoma, Japan

[21] Appl. No.: 684,722

[22] Filed: Dec. 21, 1984

[30] Foreign Application Priority Data

Dec. 28, 1983 [JP] Japan .................................. 58-250888

[51] Int. Cl.⁴ ............................................ G05D 23/32
[52] U.S. Cl. ........................................ 62/158; 62/213; 62/228.4
[58] Field of Search .................... 62/228.4, 228.5, 229, 62/158, 213; 237/2 B; 165/29

[56] References Cited

U.S. PATENT DOCUMENTS

| 4,357,988 | 11/1982 | Hudson et al. | 62/228.4 X |
| 4,387,763 | 6/1983 | Benton | 165/29 |
| 4,407,139 | 10/1983 | Ide et al. | 62/228.4 X |
| 4,419,860 | 12/1983 | Howland | 62/228.4 |

FOREIGN PATENT DOCUMENTS 55-3577 1/1980 Japan .
55-15534 12/1980 Japan .

*Primary Examiner*—William E. Wayner
*Attorney, Agent, or Firm*—Cushman, Darby & Cushman

[57] ABSTRACT

This apparatus selects a start-up mode of operation for controlling the compressor (1) at maximum speed only when the difference between the measured temperature of a room at the start of the operation and a target temperature is larger than a predetermined value. A normal mode of operation otherwise is selected for controlling the compressor (1) at a speed lower than maximum thus extending the life of the compressor (1).

13 Claims, 13 Drawing Figures

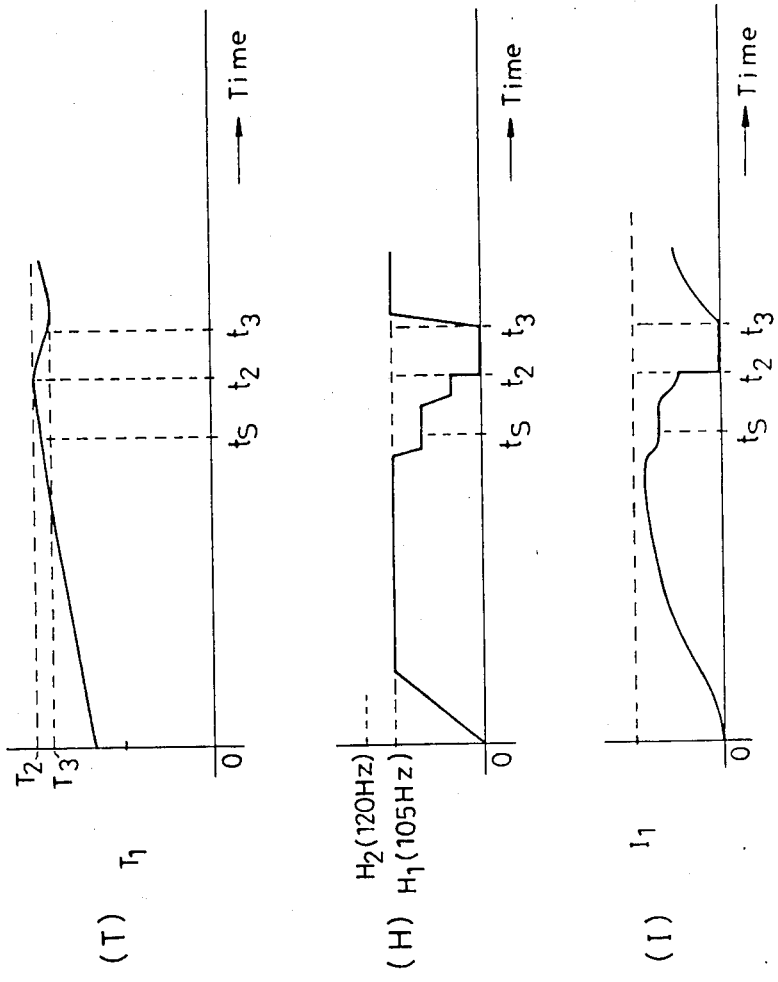

CONTROL APPARATUS FOR AN AIR CONDITIONER

BACKGROUND OF THE INVENTION

1. Field of the Invention

The present invention relates to control apparatus for an air conditioner, and particularly to an improvement of the start-up characteristics of the air conditioner.

2. Description of the Prior Art

Several inventions have been made for improving an start-up characteristics of the air conditioner.

The Japanese Published unexamined patent application No. 55-3577 is concerned with preventing abnormal wear of a compressor at start-up operation. The Japanese published unexamined patent application No. 55-3577 is directed to an arrangement for sufficiently diffusing a lubricating oil in movable parts by maintaining slow rotation of a compressor motor for a predetermined time followed by faster rotation of the motor. The Japanese published unexamined patent application No. 55-155134 is concerned with controlling the rotational speed of a motor for achieving higher energy efficiency. The published unexamined patent application No. 55-155134 deals with controlling rotational speed in response to a loading states of the system detected by using the temperature of inhalation air and the temperature of discharge air.

The above-mentioned prior-art control apparatus prevents a quick alteration of the temperature of room to a desired level.

It is obvious that rotating the motor at maximum speed immediately after starting enables quickly conditioning of the room to a target temperature, but such quick acceleration shortens the life of the compressor and lowers it energy efficiency. Furthermore, such maximum rotation is not always necessary when the room temperature is fairly close to the desired temperature at the starting time.

SUMMARY OF THE INVENTION

It is an object of the present invention to provide a control apparatus for an air conditioner wherein abnormal wear of the compressor is avoided and high energy efficiency of the compressor is achieved, while maintaining the ability of quickly conditioning a room to the desired temperature.

It is another object of the present invention to provide a control apparatus capable of changing the maximum rotation speed at start-up of the compressor in response to the room temperature at the start of air conditioning operation.

The control apparatus for controlling an air conditioner compressor in accordance with the present invention comprises:

temperature measuring means for measuring room temperature, command means for generating a command signal for normal mode operation or start-up operation in response to the room temperature, first memory means memorising normal rotation data, corresponding to rotation speed of the compressor during normal mode operation, second memory means memorising start-up rotation data, corresponding to rotation speed of a compressor de during start-up operation, selecting means for outputting the normal rotation data memorised in the first memory means when a command signal of normal mode operation is inputted from the command means, and outputting the start-up rotation data memorised in a second memory means when the command signal of start-up operation is inputted from the command means, and control means for controlling rotational speed of the compressor in response to an output of the selecting means.

BRIEF DESCRIPTION OF THE DRAWINGS

FIGS. 4(a), 5(a) and 6(a) are graphs illustrating the relationship between room temperature and time.

FIGS. 4(b), 5(b) and 6(b) are graphs illustrating the relationship between frequency of control signal from control means 26 and time.

FIGS. 4(c), 5(c) and 6(c) are graphs illustrating the relationship between current consumed in outdoor unit and time.

DETAILED DESCRIPTION OF THE PREFERRED EMBODIMENT

Figure 1:
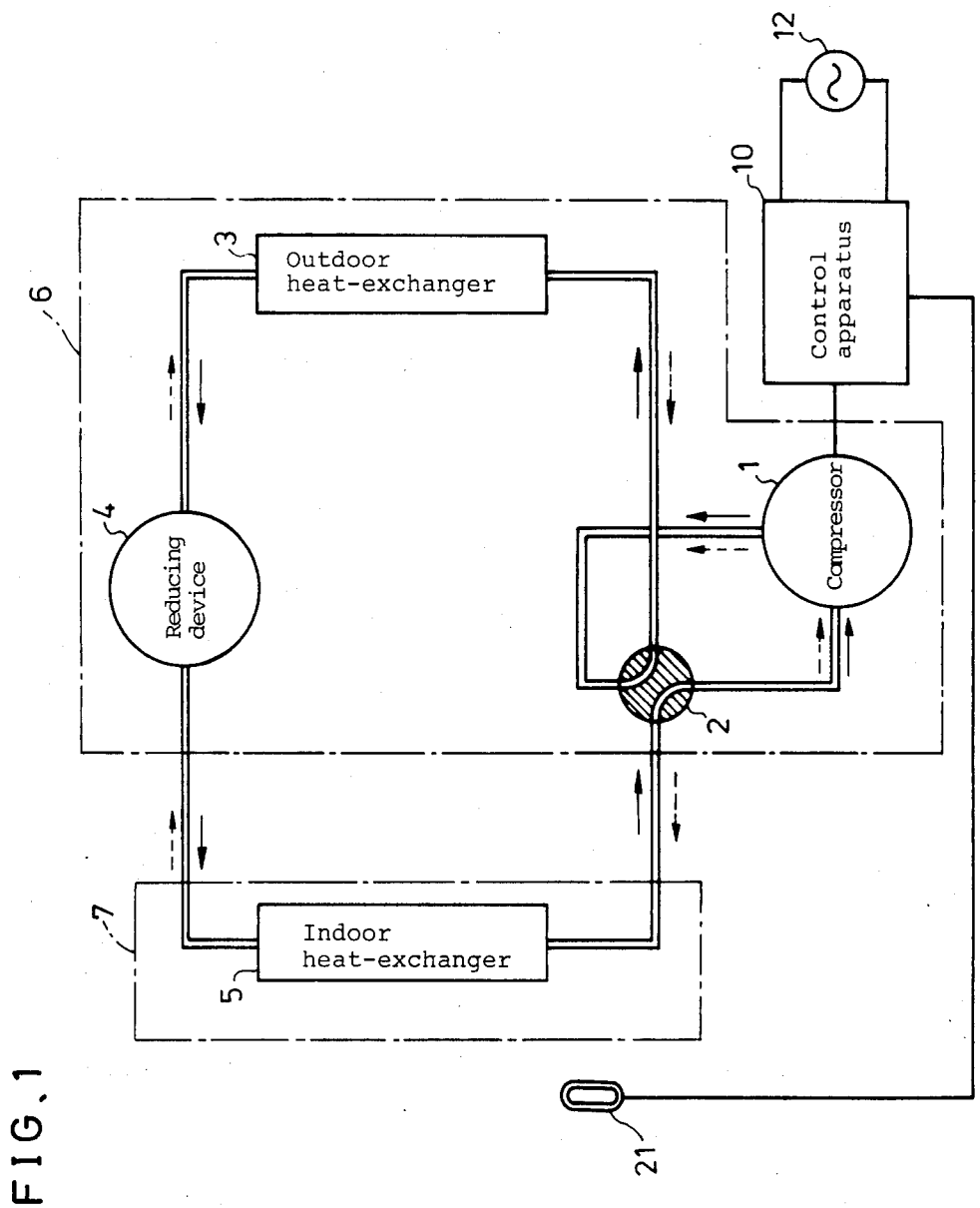
FIG. 1 is a diagrammatic illustration of an air conditioner incorporating the control apparatus in accordance with the present invention.

FIG. 1 is a diagrammatic illustration of an air conditioner incorporating the control apparatus of the present invention. The air conditioner includes an outdoor unit 6 comprising a compressor 1, a four-way valve 2, an outdoor heat-exchanger 3, a pressure reducing device 4 and a fan (not shown), and an indoor unit 7 comprising an indoor heat-exchanger 5. A refrigerating circuit is composed of the compressor 1 driven by a motor, the four-way valve 2 for switching between cooling and warming modes, the outdoor heat-exchanger 3, the pressure reducing device 4 which controls flow rate of a refrigerant and the indoor heat-exchanger 5.

In the cooling mode operation, the refrigerant flows as indicated by solid arrows in FIG. 1. The indoor heat-exchanger 5 works as an evaporator to cool the room to be conditioned. In the warming mode operation, the refrigerant flows as indicated by the dotted arrows in FIG. 1 by reversing of the four-way valve 2 from its cooling mode position shown in the drawing. Therefore, the indoor heat-exchanger 5 works as a condensor to warm the room to be conditioned.

The control apparatus 10 controls the air conditioner in response to room temperature measured by a temperature measuring means 21. The control apparatus 10 is connected to a power supply 12.

Figure 2:
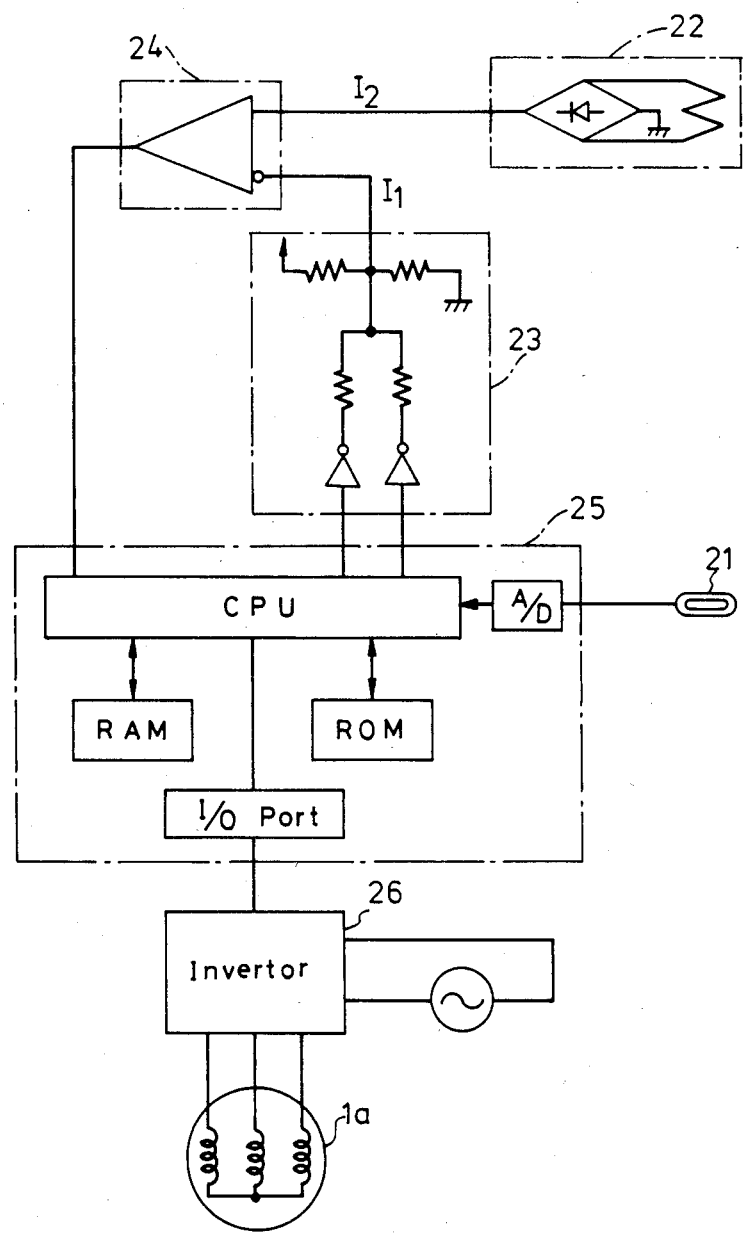
FIG. 2 is an electronic circuit diagram of the control apparatus of the present invention.

FIG. 2 shows an electric circuit for the control apparatus 10. The control apparatus 10 comprises a thermistor 21 as temperature measuring means, a current measuring device 22 for measuring the current consumed in the outdoor unit 6, a circuit 23 for generating a set amount of current, a comparator 24 for comparing the current value measured by the current measuring device 22 with the set point of current generated by the circuit 23, a microcomputer 25, and an inverter 26 as a control means for controlling the rotational speed of a motor 1a of the compressor 1. The inverter 26 outputs a control signal of variable frequency to the motor 1a, thus controlling the rotational speed of the motor 1a in response to frequency.

Figure 3:
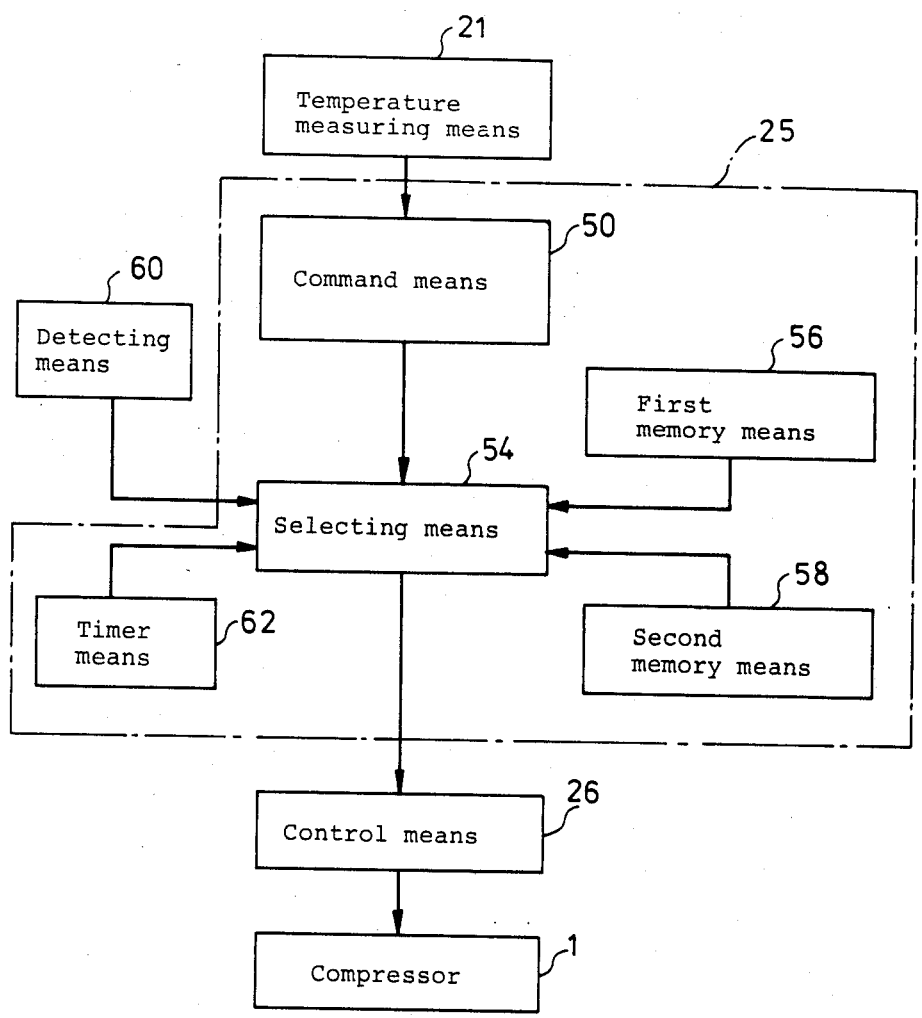
FIG. 3 is a block diagram of the control apparatus of the present invention.

FIG. 3 is a block diagram showing a combination of means or functions of the control apparatus 10. The temperature measuring means 21 measures the temperature of the room. A command means 50 generates a command signal representative of normal mode operation or start-up operation in response to the temperature measured by the temperature measuring means 21. The first memory means 56 stores data corresponding to rotational speeds of the motor 1a during normal mode operation. In this embodiment, the normal rotation data comprises a series of frequency numbers (0–105 Hz) corresponding to rotation speeds of the motor 1a. The second memory means 58 stores data corresponding to rotational speeds of the motor 1a during start-up operation. This data also constitutes a series of frequencies (0–120 Hz) corresponding to rotational speeds of the motor 1a. A detecting means 60 detects end of the start-up operation by measuring the value of current supplied to the compressor 1. A timer means 62 generates an end signal when a predetermined time period has expired.

The temperature measuring means 21 corresponds with the thermistor 21 of FIG. 2. The detecting means 60 corresponds with the current measuring device 22, the circuit 23 for generating the set value $I_1$ of current and the comparator 24. The first memory means 56, the second memory means 58, the selecting means 54 and the command means 50 correspond with the microcomputer 25 of FIG. 2. The control means 26 corresponds with inverter 26.

Referring now to FIG. 3, in the beginning of a warming mode operation, the temperature measuring means 21 measures the temperature of the room, and outputs a temperature signal. The command means 50 generates a command signal for normal mode operation when said room temperature is higher than a set value $T_1$ of temperature and generates a command signal for start-up operation when said room temperature is lower than the temperature set-point.

Figures 4A, 4B, 4C:
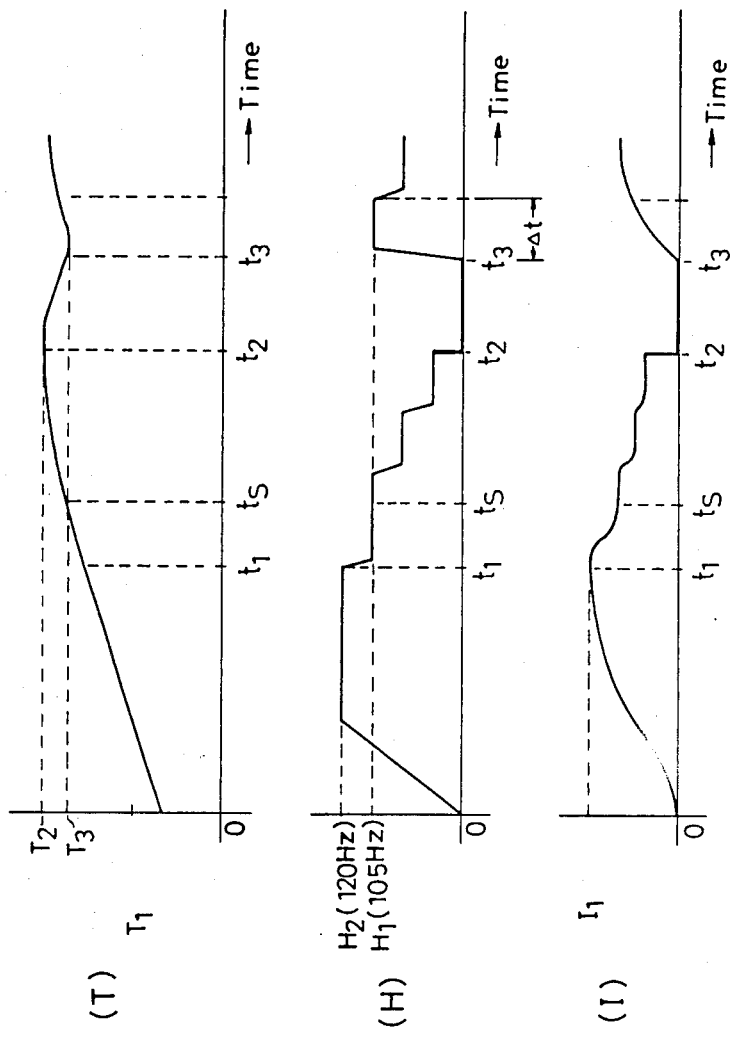

The command signal for start-up changes the air conditioner to the start-up mode of operation. In response to this signal, the selecting means 54 selects the second memory means 58 which stored the start-up rotation data, i.e. the series of data of frequencies between zero and maximum start-up frequency $H_2$ (120 Hz), thus rotating the motor 1a at maximum rotation speed. The rotation of the motor 1a compresses the refrigerant and directs it through the indoor heat-exchanger 5 (see FIG. 1). The refrigerant also passes through the pressure reducing device 4, the outdoor heat-exchanger 3 and the four-way valve 2, and returns to the compressor 1. The maximum rotation of the motor 1a causes the room to quickly warm up, as shown in FIG. 4(a), and it increases the current I consumed in the outdoor unit 6, as shown in FIG. 4(c). As is well known in the at, this current increase occurs primarily in the compressor 1 as its load increases. Until the refirgeration cycle stabilizes, the current increases towards a substantially constant level.

The start-up operation is terminated by a stop signal from the detecting means 60 or from the timer means 62. The detecting means 60 outputs a stop signal when the value of current I consumed in the outdoor unit 6 is larger than the set value $I_1$ which is predetermined by considering a relation between warming function and the values of the current I. The timer means 62 outputs a stop signal at the expiration of a set amount of time $t_s$, which is predetermined by considering the relation between the warming and time.

When the current I exceeds the set value $I_1$ within the time period $t_s$ from the start of the warming operation, the termination of the start-up operation is as follows. The current I consumed in the compressor 1 increases as shown in FIG. 4(c). The detecting means 60 outputs a stop signal to the selecting means 54 at time $t_1$. The detecting means 60 comprises the comparator 24, the current measuring device 22 and circuit 23 for generating the set value $I_1$ of current. The comparator 24 compares the current I measured by the current measuring device 22 with the set value $I_1$ outputted from the circuit 23. The comparator 24 thereby produces the stop signal at the time $t_1$. In response to this stop signal, the selecting means 54 selects the first memory means 56 which stores the normal rotation data, the series of data of frequencies between zero and a maximum normal frequency $H_1$ (105 Hz). The control means 26 outputs a control signal the maximum frequency $H_1$ (105 Hz) of the memorized frequency in first memory means 56. Therefore, the rotational speed of the motor 1a is reduced to the maximum speed for normal operation (see FIG. 4(b)). Thereafter, the control means 26 lowers the frequency of the control signal in response to rising of the room temperature (see time $t_1$ to $t_3$ in FIG. 4(b)). When the room temperature reaches a desired maximum temperature $T_2$, the control means 26 outputs a control signal having zero frequency, thus stopping the motor 1a. Thereafter, when the room temperature drops to a predetermined minimum temperature $T_3$, the control means 26 outputs a control signal having the maximum normal frequency $H_1$ (105 Hz). After that, the motor 1a is controlled in the normal mode of operation.

Figures 5A, 5B, 5C:
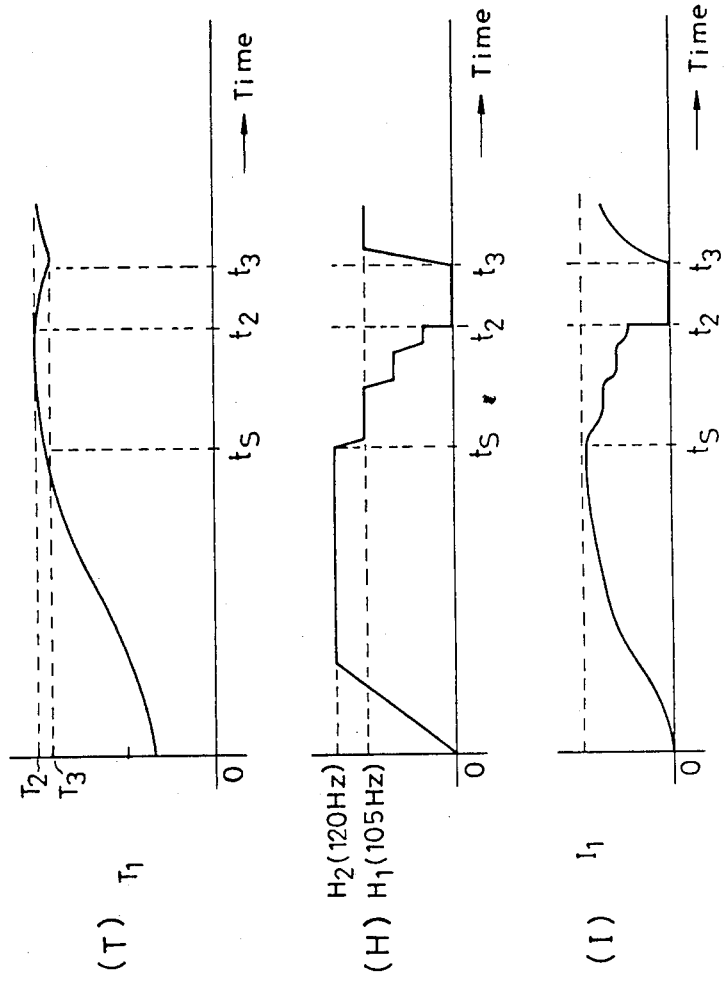

When the current I does not exceed the set value $I_1$ within the predetermined time period $t_s$ from the start of the warming operation, termination of the start-up operation occurs as follows. Referring to FIG. 5, the current I consumed in the outdoor unit 6 increases as shown in FIG. 5(c). The timer means 62 outputs a stop signal at time $t_s$ from the start of the warming operation (see FIG. 5). In response to this stop signal, the selecting means 54 selects the first memory means 56 which stores the normal rotation data, i.e. the series of data of frequencies between zero and maximum normal frequency (105 Hz). After that, the motor 1a is controlled in the normal mode of operation.

In case where the room temperature is higher than the set value $T_1$ of temperature at the beginning of the warming mode operation, the command means 50 does not produce a command signal for a start-up operation, but instead produces a command signal for the normal mode of operation. Referring to FIG. 6, in response to a command signal for normal operation, the selecting means 54 selects the first memory means 56 which stores the normal rotation data. The control means 26 raises its output frequency to the maximum normal frequency, as shown in FIG. 6(b), thus increasing the rotation speed of the motor 1a to its maximum rotation speed in normal operation. The maximum normal rotation of the motor 1a quickly causes the room to be warmed, as shown in FIG. 6(a). Thereafter the motor 1a is controlled as in normal rotation operation.

Referring again to FIG. 2, the start-up operation will be described in greater detail as follows. The microcomputer 25 selects the second memory which stores rotation data for the start-up operation, and outputs rotation data to the inverter 26. The inverter 26 controls rotation of the motor 1a in the start-up mode of operation. The circuit 23 receives informations as to the state of the motor 1a from the microcomputer 25, and outputs a signal for the set-value $I_1$ of current. The current measuring device 22 measures the current consumed in the outdoor unit 6. The comparator 24 compares the signal of the set value $I_1$ and the current consumed in the outdoor unit 6.

When the current consumed in the outdoor unit 6 is greater than the set value $I_1$, the comparator 24 output is changed to a high level to develop a stop signal. The microcomputer 25 responds to this signal by selecting the first memory which stores rotation data for normal operation. The microcomputer 25 outputs this rotation data to the inverter 26 to cause rotation of the motor 1a in the normal mode of operation. Therefore, the motor 1a continues to be controlled in this mode of operation.

When the current consumed in the outdoor unit 6 is smaller than the set value $I_1$, the comparator 24 maintains a low level output and thus does not produce a stop signal. In this case the motor 1a remains controlled in the start-up mode of operation.

In the case where the room temperature is higher than the set value $T_1$ of temperature at the beginning of the warming mode operation, the microcomputer 25 operates in the normal mode of operation as follows. The microcomputer 25 selects the first memory which stores rotation data for normal operation, and it outputs this data to the invertor 26. The motor 1a thus is controlled in the normal mode of operation.

Figure 7:
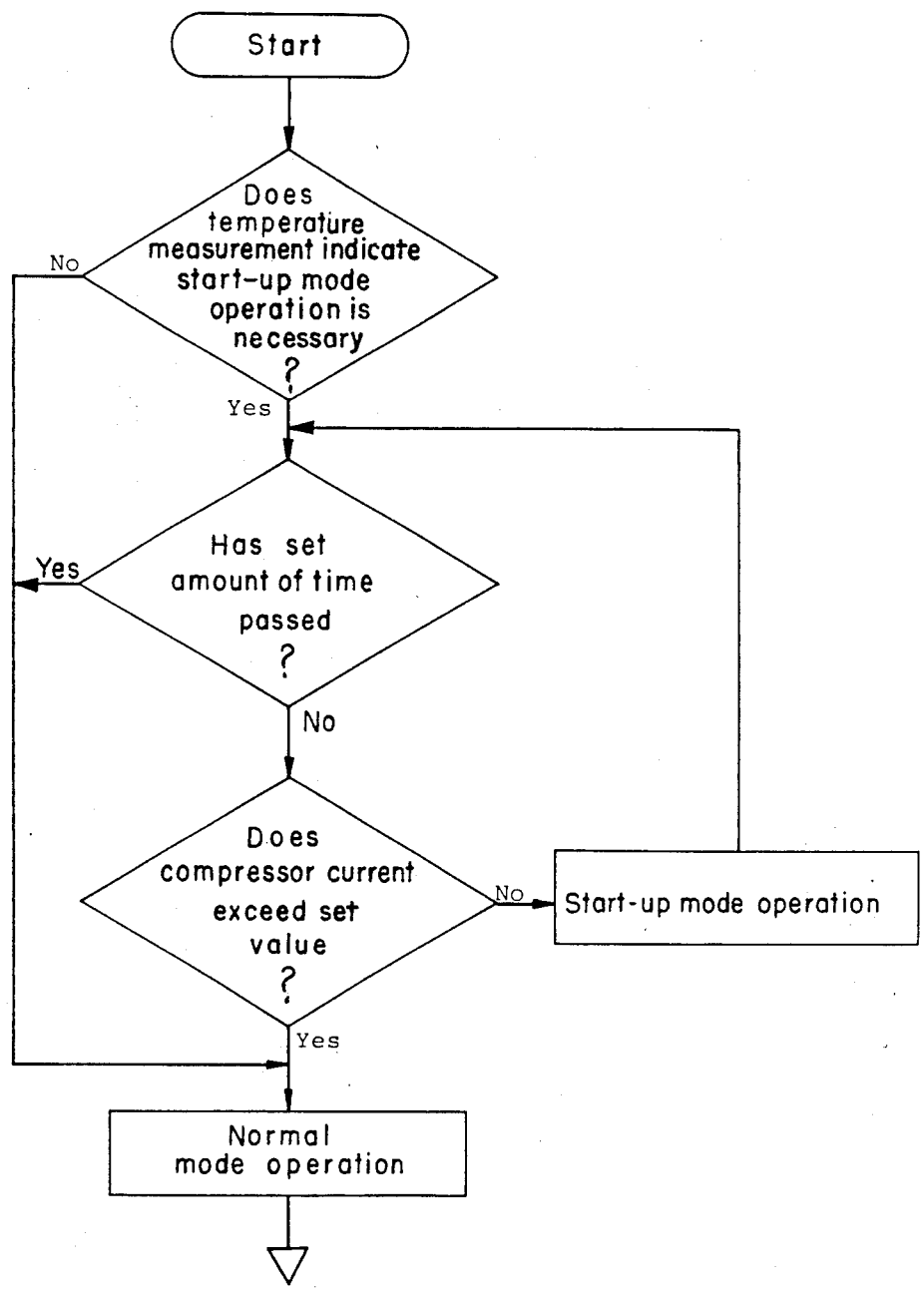
FIG. 7 is a flow chart illustrating the sequence of operation of the control apparatus of the present invention.

Referring now to FIG. 7, control the decisions of the invention occur as follows. Step 1 determines whether to select the start-up or normal mode of operation, depending on the measured temperature of the room. If start-up is indicated, step 2 examines whether the measured time is still within the predetermined time period $t_s$. If not, the normal mode of operation is carried out. Step 3 examines whether the measured current consumed in the outdoor unit 6 exceeds the set value $I_1$. When the measured current is larger than the set point $I_1$, the normal mode of operation is carried out. When the measured current is smaller than the set value $I_1$, the start-up mode of operation is carried out, and steps 2 and 3 are repeated.

In the above descriptions the invention is concerned with the warming mode operation. It is apparent, of course, that the invention is equally applicable to a cooling mode of operation.

In place of the device for measuring the current consumed in the outdoor unit, a device for measuring the current consumed in the compressor may be substituted to obtain substantially the same results.

The control apparatus according to the present invention can achieve high energy efficiency, and it prevents abnormal wear of the compressor while maintaining the capability of quickly changing the temperature of the room to the desired temperature. It does so because the apparatus controls the maximum rotation speed at start-up operation of the compressor in response to the room temperature at the beginning of the air conditioning operation.

What is claimed is:

1. A control apparatus for an air conditioner comprising:

temperature measuring means for measuring room temperature, command means for generating a command signal for a normal mode of operation when said room temperature at the start of a warming operation is higher than a set value of temperature, and generating a command signal for a start-up mode of operation when said room temperature at the start of said warming operation is lower than said set value of temperature, first memory means for storing rotation data corresponding to rotational speed of a compressor in a normal mode of operation, said data having a limit of a first maximum corresponding to maximum rotation speed of said compressor in normal operation, second memory means for storing rotation data corresponding to rotational speed of said compressor in a start-up mode of operation, said start-up rotation data having a limit of a second maximum corresponding to maximum rotation speed of the compressor in the start-up mode of operation, said second maximum rotation speed being larger than said first maximum rotation speed, selecting means for outputting said normal mode rotation data stored in said first memory means when said command signal for normal mode operation is inputted from said command means, and for outputting said start-up mode rotation data stored in said second memory means when said command signal for start-up operation is inputted from said command means, and control means for controlling the rotational speed of the compressor corresponding to the output of said selecting means.

2. A control apparatus for an air conditioner comprising:

temperature measuring means for measuring room temperature, command means for generating a command signal for a normal mode of operation when said room temperature at the start of a cooling operation is lower than a set value of temperature, and generating a command signal for a start-up mode of operation when said room temperature at the start of said cooling operation is higher than said set value of temperature, first memory means for storing rotation data corresponding to rotational speed of a compressor in a normal mode of operation, said data having data within a limit of a first maximum corresponding to maximum rotation speed of said compressor in normal operation, second memory means for storing rotation data corresponding to rotational speed of said compressor in a start-up mode of operation, said start-up rotation data having a limit of a second maximum corresponding to maximum rotational speed of the compressor in the start-up mode of operation, said second maximum rotation speed being larger than said first maximum rotation speed, selecting means for outputting said normal mode rotation data stored in said first memory means when said command signal for normal mode operation is inputted from said command means, and for outputting said start-up mode rotation data stored in said second memory means when said command signal for start-up operation is inputted from said command means, and control means for controlling the rotational speed of the compressor corresponding to the output of said selecting means.

3. A control apparatus for an air conditioner in accordance with claim 1 or claim 2 further comprising:
   (a) timer means for generating a stop signal when measured time from the beginning of an air conditioning operation reaches a set amount of time, said stop signal causing normal mode operation to the compressor irrespective of the output of said command means.

4. A control apparatus for an air conditioner in accordance with claim 3, wherein
   said first memory means stores a series of data representative of frequencies between zero and a first maximum,
   said second memory means stores a series of data representative of frequencies between zero and a second maximum which is greater than said first maximum frequency, and
   said control means outputs a control signal having a frequency determined by said output of said selecting means.

5. A control apparatus for an air conditioner in accordance with claim 1 or 2 further comprising:
   detecting means for generating a stop signal when current consumed in an outdoor unit exceeds a set value of current, said stop signal causing normal mode operation of the compressor irrespective of the output of said command means.

6. A control apparatus for an air conditioner in accordance with claim 5, wherein
   said first memory means stores a series of data representative of frequencies between zero and a first maximum,
   said second memory means stores a series of data representative of frequencies between zero and a second maximum which is greater than said first maximum frequency, and
   said control means outputs a control signal having a frequency determined by said output of said selecting means.

7. A control apparatus for an air conditioner in accordance with claim 1 or 2 further comprising:
   timer means for generating a stop signal when measured time from the beginning of an air conditioning operation reaches a set amount of time, and
   detecting means generating a stop signal when current consumed in an outdoor unit exceeds a set value of current,
   both of said stop causing normal mode operation of the compressor irrespective of the output of said command means.

8. A control apparatus for an air conditioner in accordance with claim 7, wherein
   said first memory means stores a series of data representative of frequencies between zero and a first maximum,
   said second memory means stores a series of data representative of frequencies between zero and a second maximum which is greater than said first maximum frequency, and
   said control means outputs a control signal having a frequency determined by said output of said selecting means.

9. A control apparatus for an air conditioner in accordance with claim 8, wherein
   said detecting means comprises,
   a circuit for generating said set value of current,
   a current measuring device for measuring the current consumed in said outdoor unit, and
   a comparator for outputting said stop signal to said selecting means when said current consumed in the outdoor unit exceeds said set value of current whereby said first memory is selected.

10. A control apparatus for an air conditioner comprising:
    temperature measuring means for measuring room temperature,
    command means for generating a command signal for a normal mode of operation when said room temperature at the start of a warming operation is higher than a set value of temperature, and generating a command signal for a start-up mode of operation when said room temperature at the start of said warming operation is lower than said set value of temperature,
    first memory means for storing rotation data corresponding to rotational speed of a compressor in a normal mode of operation, said data having a limit of a first maximum corresponding to maximum rotation speed of said compressor in normal operation,
    a second memory means for storing rotation data corresponding to rotational speed of said compressor in a start-up mode of operation, said start-up rotation data having a limit of a second maximum corresponding to maximum rotation speed of the compressor in the start-up mode of operation, said second maximum rotation speed being lager than said first maximum rotation speed,
    selecting means for outputting said normal mode rotation data stored in said first memory means when said command signal for normal mode operation is inputted from said command means, and for outputting said start-up mode rotation data stored in said second memory means when said command signal for start-up operation is inputted from said command means,
    a control means for controlling the rotational speed of the compressor corresponding to the output of said selecting means,
    timer means for generating a stop signal when measured time from the beginning of an air conditioning operation reaches a set amount of time, and
    detecting means generating a stop signal when current consumed in an outdoor unit exceeds a set value of current,
    both of said stop signals causing normal mode operation irrespective of the output of said command means.

11. A control mapparatus for an air conditioner comprising:
    temperature measuring means for measuring room temperature,
    command means generating a command signal for a normal mode of operation when said room temperature at the start of a cooling operation is lower than a set value of temperature or when said room temperature at the start of a warming operation is higher than set value of temperature, and generating a command signal for a start-up mode of operation when said room temperature at the start of said cooling operation is higher than said set value of temperature or when said room temperature at the start of warming operation is lower than said set value of temperature, a first memory means for storing a series of data representative of frequencies between zero and a first maximum, a second memory means for storing a series of data representative of frequencies between zero and a second maximum which is greater than said first maximum frequency, selecting means for outputting data stored in said first memory means when said command signal for normal mode operation is inputted from said command means, and for outputting data stored in said second memory means when said command signal for start-up operation is inputted from said command means, (a) control means for controlling the rotational speed of a compressor corresponding to the data output from said selecting means, timer means for generating a stop signal when measured time from the beginning of an air conditioning operation reaches a set amount of time, and detecting means for generating a stop signal when current consumed in an outdoor unit exceeds a set value of current, both of said stop signals causing normal mode operation irrespective of the output of said command means.

12. A control apparatus for an air conditioner in accordance with claim 10 or 11, wherein said detecting means comprises, a circuit for generating said set value of current, a current measuring device for measuring the current consumed in said outdoor unit, and a comparator for outputting said stop signal to said selecting means when said current consumed in said outdoor unit exceeds said set value of current whereby said first memory is selected.

13. A control apparatus for an air conditioner comprising:

temperature measuring means for measuring room temperature, command means generating a command signal for a normal mode of operation when said room temperature is higher than a set value of temperature, and generating a command signal for a start-up mode of operation when said room temperature is lower than said set value of temperature, a first memory means for storing a series of data representative of frequencies between zero and a first maximum, a second memory means for storing a series of data representative of frequencies between zero and a second maximum which is greater than said first maximum frequency, selecting means for outputting data stored in said first memory means when said command signal for normal mode operation is inputted from said command means, and for outputting data stored in said second memory means when said command signal for start-up operation is inputted from said command means, control means for controlling the rotational speed of a compressor corresponding to the data output from said selecting means, timer means for generating a stop signal when measured time from the beginning of an air conditioning operation reaches a set amount of time, a circuit for generating said set value of current, a current measuring device for measuring the current consumed in an outdoor unit, a comparator for outputting a stop signal to said selecting means when said current consumed in the outdoor unit exceeds a set value of current whereby said first memory is selected, both of said stop signals from said timer means and said comparator causing normal mode operation irrespective of the output of said command means.

* * * * *